US010562489B2

(12) United States Patent
Sadakhom et al.

(10) Patent No.: US 10,562,489 B2
(45) Date of Patent: Feb. 18, 2020

(54) COVER FOR A SEATBELT RETRACTOR ASSEMBLY TO REDUCE AUDIBLE NOISE AND A SEATBELT RETRACTOR ASSEMBLY INCLUDING THE COVER

(71) Applicant: Ford Global Technologies, LLC, Dearborn, MI (US)

(72) Inventors: Sone Sadakhom, Ypsilanti, MI (US); Michael Lee, Royal Oak, MI (US); Joseph Cicchelli, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/909,583

(22) Filed: Mar. 1, 2018

(65) Prior Publication Data

US 2019/0270427 A1 Sep. 5, 2019

(51) Int. Cl.
*B60R 22/34* (2006.01)
*B32B 5/18* (2006.01)

(52) U.S. Cl.
CPC ............ *B60R 22/3413* (2013.01); *B32B 5/18* (2013.01); *B60R 2022/3402* (2013.01)

(58) Field of Classification Search
CPC . B60R 22/34; B60R 22/3413; B60R 22/4676; B60R 13/0084; B60R 2022/3402
See application file for complete search history.

(56) References Cited

U.S. PATENT DOCUMENTS

| | | | | |
|---|---|---|---|---|
| 5,209,421 A * | 5/1993 | Fujiwara | ................. | B60R 22/34 242/379 |
| 6,082,655 A | 7/2000 | Verellen et al. | | |
| 6,474,586 B1 * | 11/2002 | Kapanka | ................. | B60R 22/28 242/379.1 |
| 2008/0265079 A1 * | 10/2008 | Boegge | ................... | B60R 22/34 242/379.2 |
| 2008/0292832 A1 * | 11/2008 | Zika-Beyerlein | .......................... | B60R 13/0876 428/91 |
| 2010/0307867 A1 * | 12/2010 | Ogawa | ...................... | B32B 3/18 181/288 |
| 2013/0270380 A1 * | 10/2013 | Ellison | .................... | B60R 22/34 242/379 |
| 2014/0054405 A1 * | 2/2014 | Clark | .................... | B60R 22/405 242/383.2 |

* cited by examiner

Primary Examiner — Sang K Kim
(74) Attorney, Agent, or Firm — Vichit Chea; Price Heneveld LLP

(57) ABSTRACT

A cover for a seatbelt retractor assembly comprising: a first layer having an inside surface configured to face a seatbelt webbing retracted by a seatbelt retractor assembly, an outside surface configured to face away from the seatbelt webbing, a plurality of holes disposed through the first layer from the inside surface through to the outside surface, and baffles adjacent each of the plurality of holes. The cover reduces audible noise generated by moving components of the seatbelt retractor assembly. The baffles adjacent each of the plurality of holes are disposed on the inside surface. The cover can further include a second layer, which includes a sound absorbing material such as foam. The second layer at least partially covers the outside surface of the first layer and covers the plurality of holes. The cover can further include snap fit fastening elements to connect the cover to the seatbelt retractor assembly.

20 Claims, 15 Drawing Sheets

COVER FOR A SEATBELT RETRACTOR ASSEMBLY TO REDUCE AUDIBLE NOISE AND A SEATBELT RETRACTOR ASSEMBLY INCLUDING THE COVER

FIELD OF THE INVENTION

The present invention generally relates to a seatbelt retractor assembly for a vehicle and, more specifically, for a cover attached to the seatbelt retractor assembly to reduce audible noise.

BACKGROUND OF THE INVENTION

Some vehicles include a seatbelt restraint system, which includes seatbelt webbing, in order to secure an occupant of the vehicle within a seating assembly, such as when the vehicle suddenly decreases speed or changes direction of movement. Such a seatbelt restraint system may include a seatbelt retractor assembly, which retracts the seatbelt webbing to reduce slack in the seatbelt webbing when securing the occupant within the seating assembly. The seatbelt retractor assembly generates noise that can be heard by the occupant.

SUMMARY OF THE INVENTION

According to a first aspect of the present invention, a cover for a seatbelt retractor assembly comprises: a first layer having an inside surface configured to face a seatbelt webbing retracted by a seatbelt retractor assembly, an outside surface configured to face away from the seatbelt webbing, a plurality of holes disposed through the first layer from the inside surface through to the outside surface, and baffles adjacent each of the plurality of holes.

Embodiments of the first aspect of the invention can include any one or a combination of the following features:
  the baffles adjacent each of the plurality of holes are disposed on the inside surface;
  a second layer that comprises foam;
  the second layer at least partially covers the outside surface of the first layer;
  the first layer has a thickness and the second layer has a thickness, wherein the thickness of the second layer is greater than the thickness of the first layer;
  the plurality of holes and the baffles adjacent each of the plurality of holes form a grid;
  the grid includes at least four holes aligned in a first direction and at least four holes aligned in a second direction, which is orthogonal to the first direction;
  snap fit fastening elements configured to connect the cover to the seatbelt retractor assembly;
  the snap fit fastening elements include a pair of opposing snap fit fastening elements disposed along a perimeter of the cover; and
  the snap fit fastening elements include a first pair of opposing snap fit fastening elements, a second pair of opposing snap fit fastening elements, and a third pair of opposing snap fit fastening elements.

According to a second aspect of the present invention, a seatbelt retractor assembly for a vehicle comprises: a frame including a lateral wall and a pair of opposing side walls extending from the lateral wall forming a webbing retaining area; a spool disposed within the webbing retaining area between the pair of opposing side walls; seatbelt webbing including a wound portion wound around the spool and an unwound portion extending away from the webbing retaining chamber; and a cover disposed over at least part of the wound portion of the seatbelt webbing, the cover comprising: a first layer having an inside surface facing the wound portion of the seatbelt webbing and an outside surface facing away from the wound portion of the seatbelt webbing; a plurality of holes disposed through the first layer from the inside surface through to the outside surface; and baffles adjacent each of the plurality of holes.

Embodiments of the second aspect of the invention can include any one or a combination of the following features:
  the cover is attached to the frame;
  the cover further includes snap fit fastening elements attaching the cover to the frame;
  the pair of opposing side walls of the frame include a first side wall and a second side wall;
  the snap fit fastening elements include a first snap fit fastening element attaching the cover to the first side wall and a second snap fit fastening element opposing the first snap fit fastening element and attaching the cover to the second side wall;
  a cross member with a first end connected to the first side wall of the pair of opposing side walls of the frame and a second end connected to the second side wall of the pair of opposing side walls of the frame, the cross member disposed above the wound portion of the seatbelt webbing;
  the cover further comprising snap fit fastening elements, the snap fit fastening elements including: a first snap fit fastening element attaching the cover to the cross member; and a second snap fit fastening element opposing the first snap fit element attaching the cover to the cross member;
  a first casing disposed laterally of a first side wall of the opposing side walls of the frame;
  a second casing disposed laterally of a second side of the opposing side walls of the frame;
  both the first casing and the second casing extend laterally outward relative to the cover;
  the snap fit fastening elements of the cover further include a third snap fit fastening element attaching the cover to the cross member and a fourth snap fit fastening element opposing the third snap fit element attaching the cover to the cross member;
  the cover further includes a second layer over the outside surface of the first layer, the second layer comprising a foam;
  the baffles adjacent each of the plurality of holes are disposed on the inside surface of the first layer of the cover; and
  the plurality of holes and the baffles adjacent each of the plurality of holes form a grid; and
  the grid includes at least four holes aligned in a first direction and at least four holes aligned in a second direction, which is orthogonal to the first direction.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
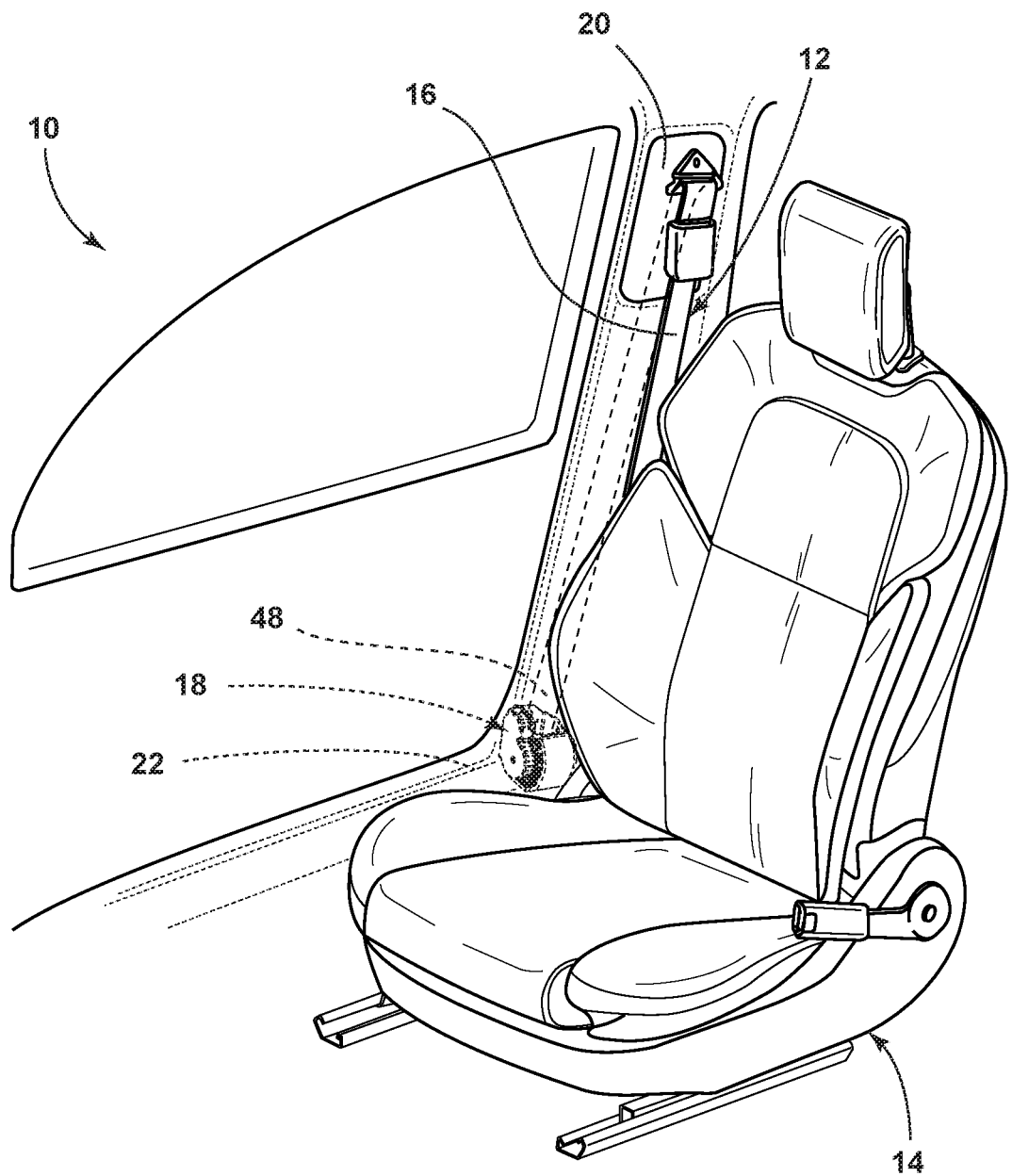
FIG. 1 is a perspective view of an interior of a vehicle, illustrating a seatbelt restraint system including a seatbelt retractor assembly attached to a frame of the vehicle retracting seatbelt webbing.

It is to be understood that the disclosure may assume various orientations other than that illustrated in FIG. 1, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
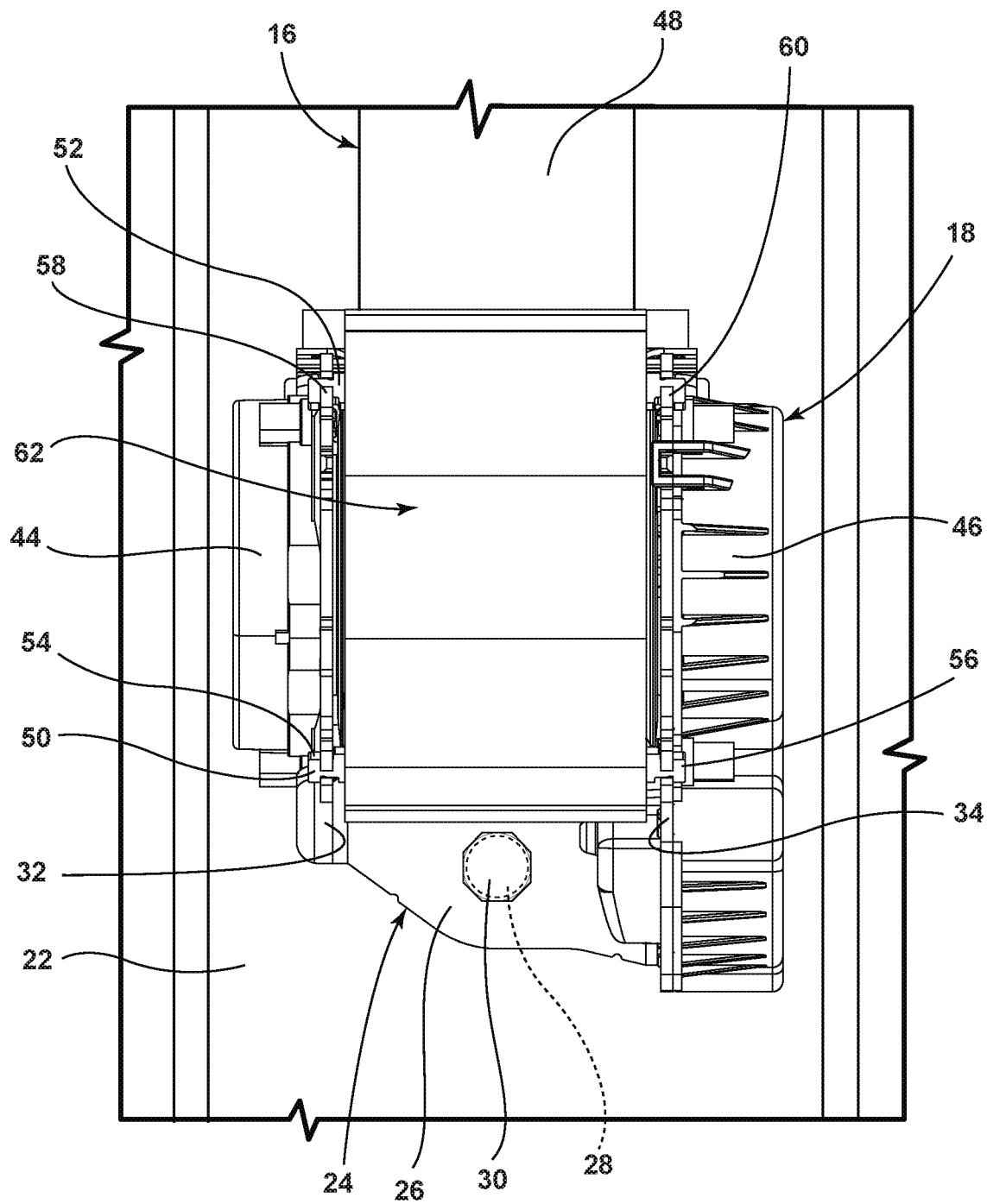
FIG. 2 is a front perspective view of the seatbelt retractor assembly of FIG. 1 attached to the frame of the vehicle, illustrating a frame of the seatbelt retractor assembly supporting a first casing, a second casing, and a cover to reduce audible noise generated by the seatbelt retractor assembly.
Figure 3A:
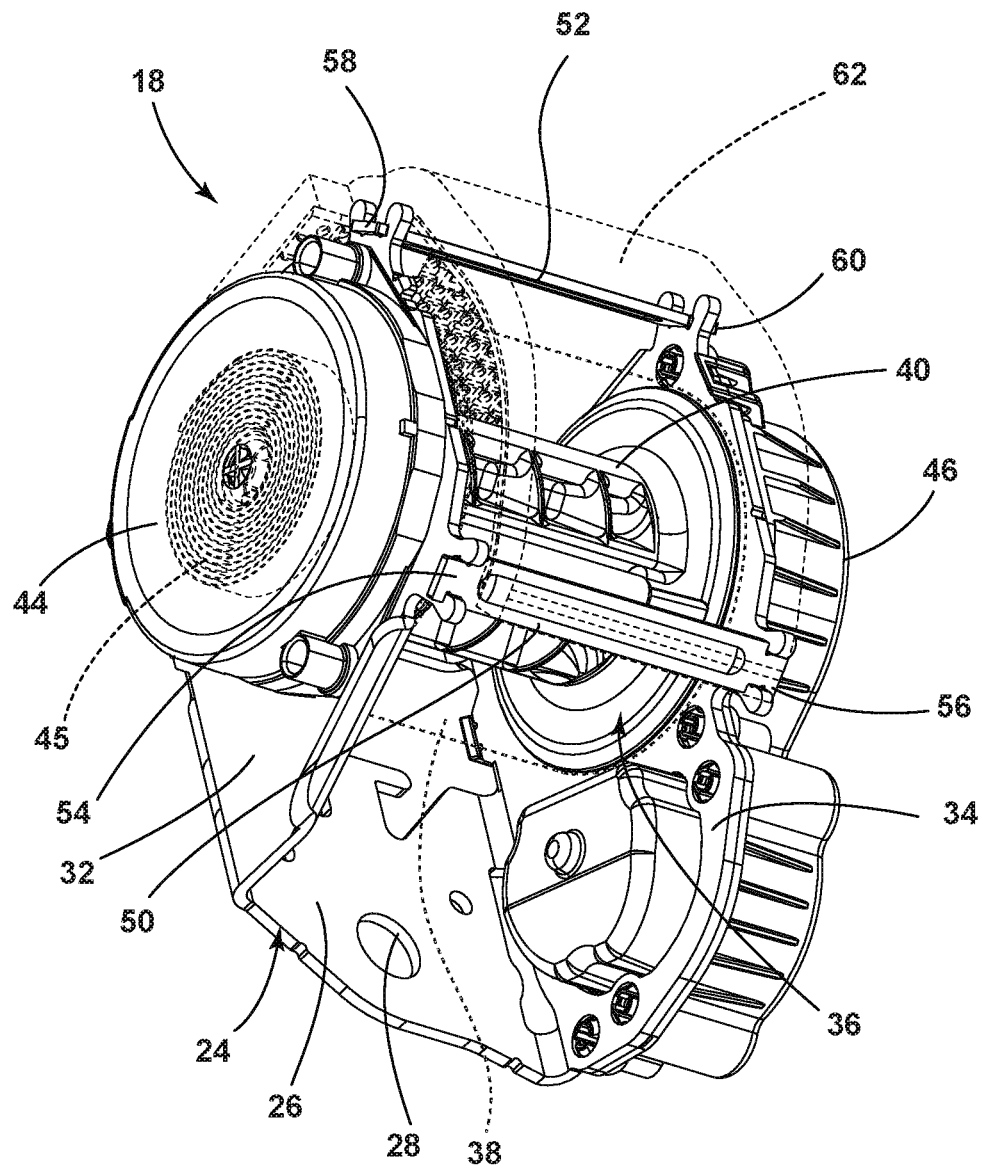
FIG. 3A is a perspective view of the seatbelt retractor assembly of FIG. 1, illustrating a first side wall, a lateral wall, and a second side wall of the frame of the seatbelt retractor assembly forming a webbing retaining area where a wound portion of the seatbelt webbing is retained, with the wound portion illustrated in phantom.
Figure 3B:
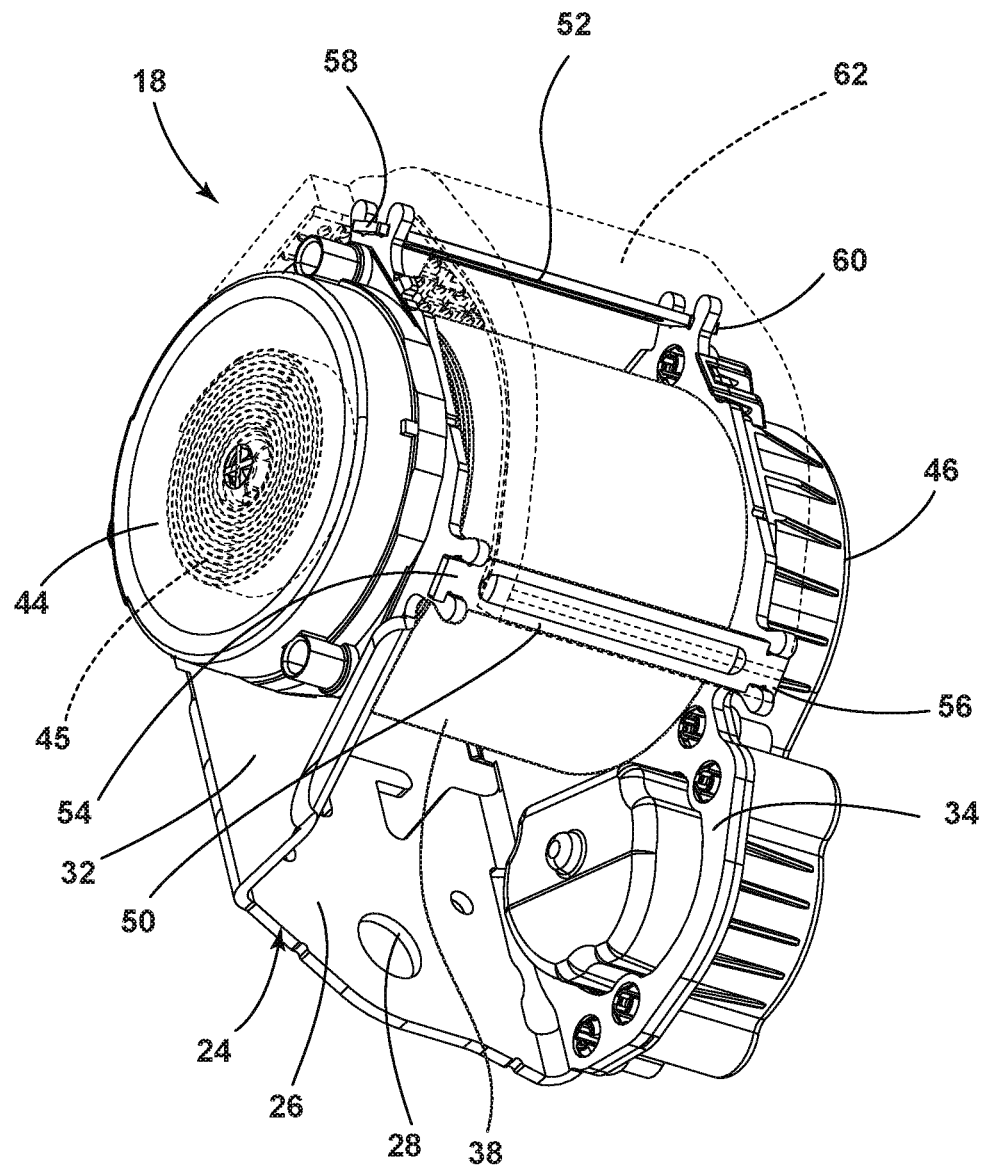
FIG. 3B is a perspective view of the seatbelt retractor assembly of FIG. 1, illustrating a first side wall, a lateral wall, and a second side wall of the frame of the seatbelt retractor assembly forming a webbing retaining area where a wound portion of the seatbelt webbing is retained.
Figure 4:
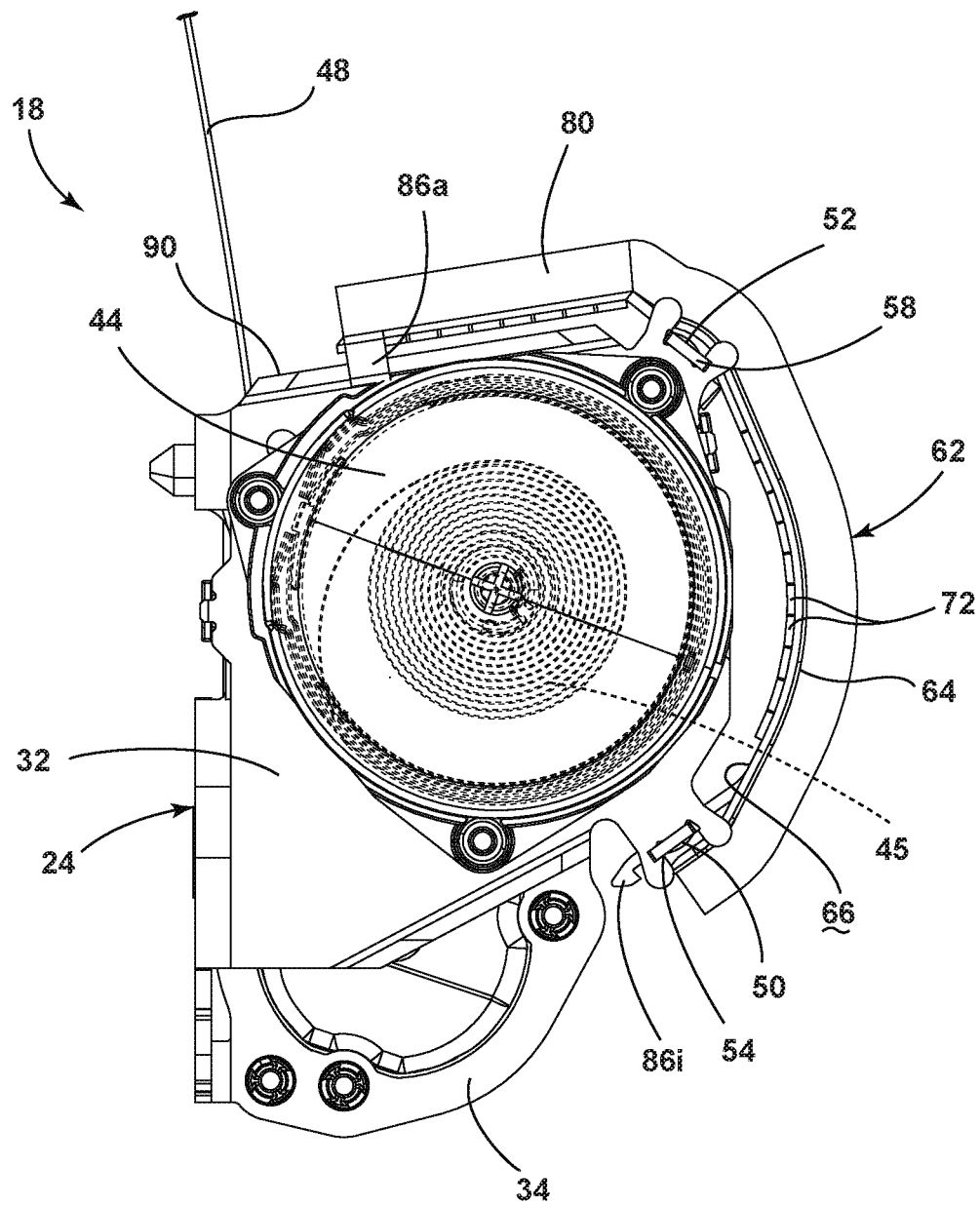
FIG. 4 is a side view of the seatbelt retractor assembly of FIG. 1, illustrating the first casing attached to the first side wall and enclosing a biasing spring (in phantom) that retracts the seatbelt webbing into the webbing retaining area.
Figure 5:
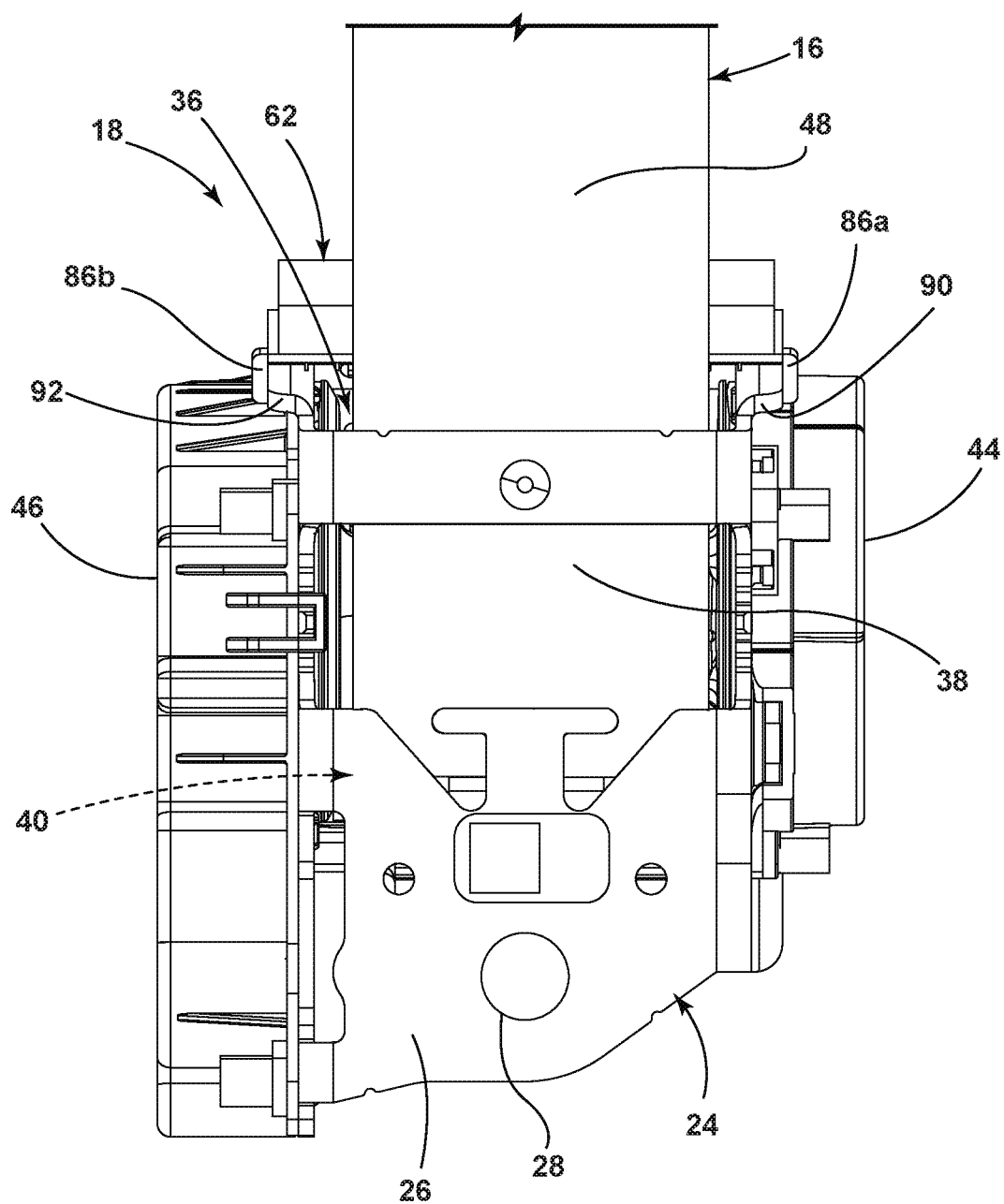
FIG. 5 is a rear view of the seatbelt retractor assembly of FIG. 1, illustrating the wound portion of the seatbelt webbing retained in the webbing retaining area.
Figure 6:
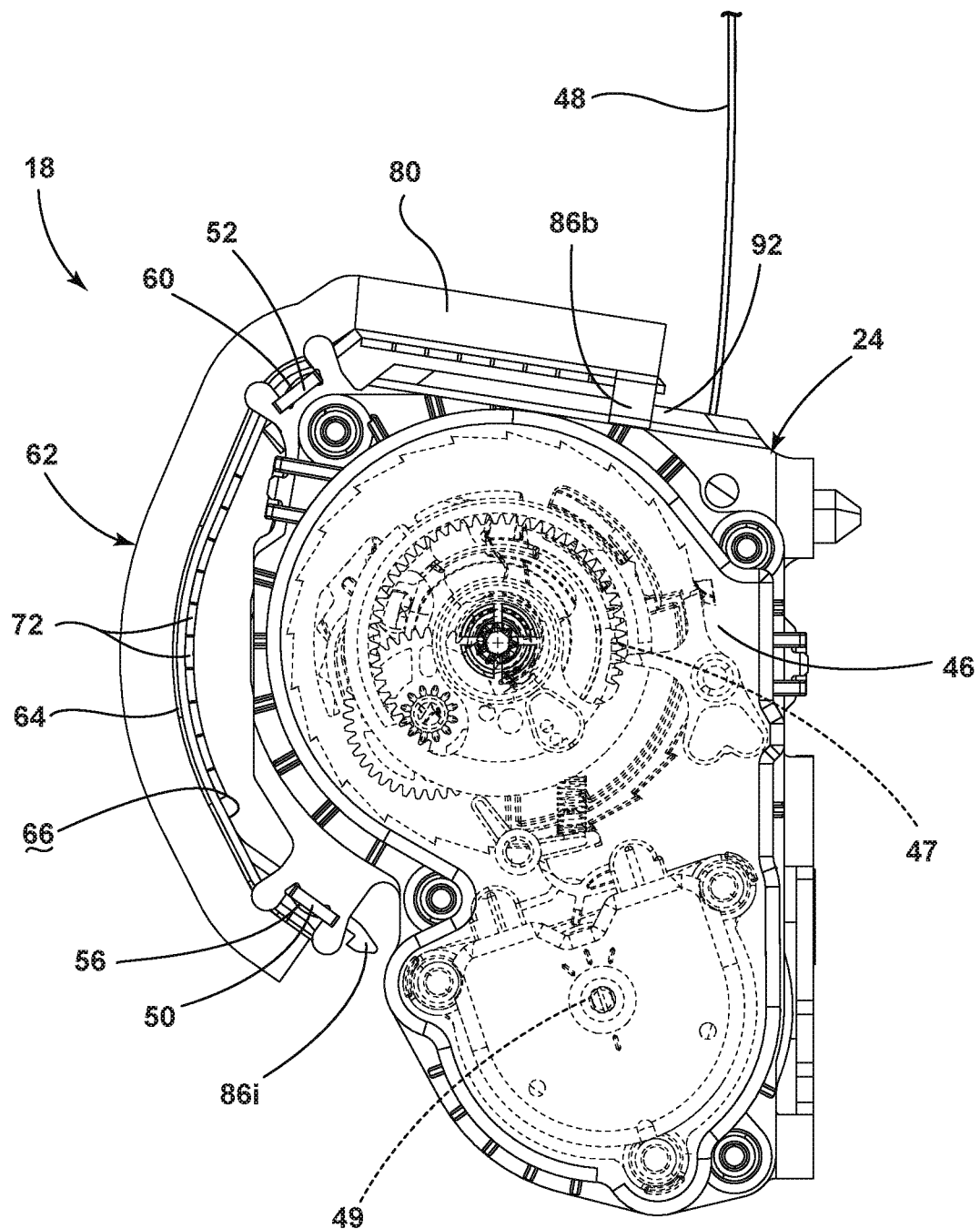
FIG. 6 is an opposite side view of the seatbelt retractor assembly of FIG. 1, illustrating the second casing attached to the second side wall and enclosing gears and a sensor ball (in phantom), which produces audible noise during operation of the seatbelt retractor assembly.
Figure 7:
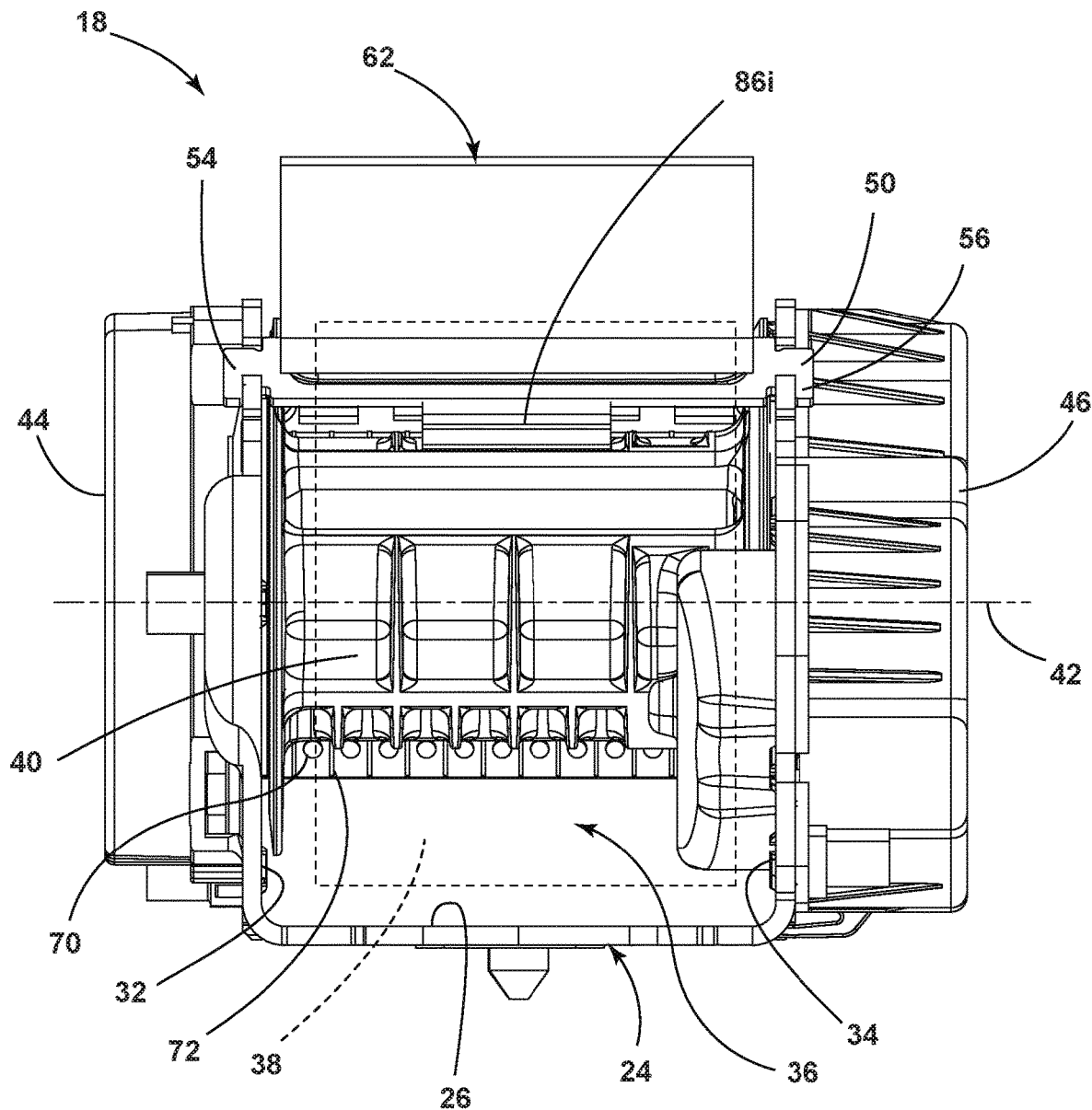
FIG. 7 is a bottom view of the seatbelt retractor assembly of FIG. 1, illustrating a spool within the webbing retaining area, around which the wound portion (in phantom) of the seatbelt webbing is wound, as well as a snap-fit fastening element of the cover snapped over a first cross member extending between the first side wall and the second side wall.
Figure 8:
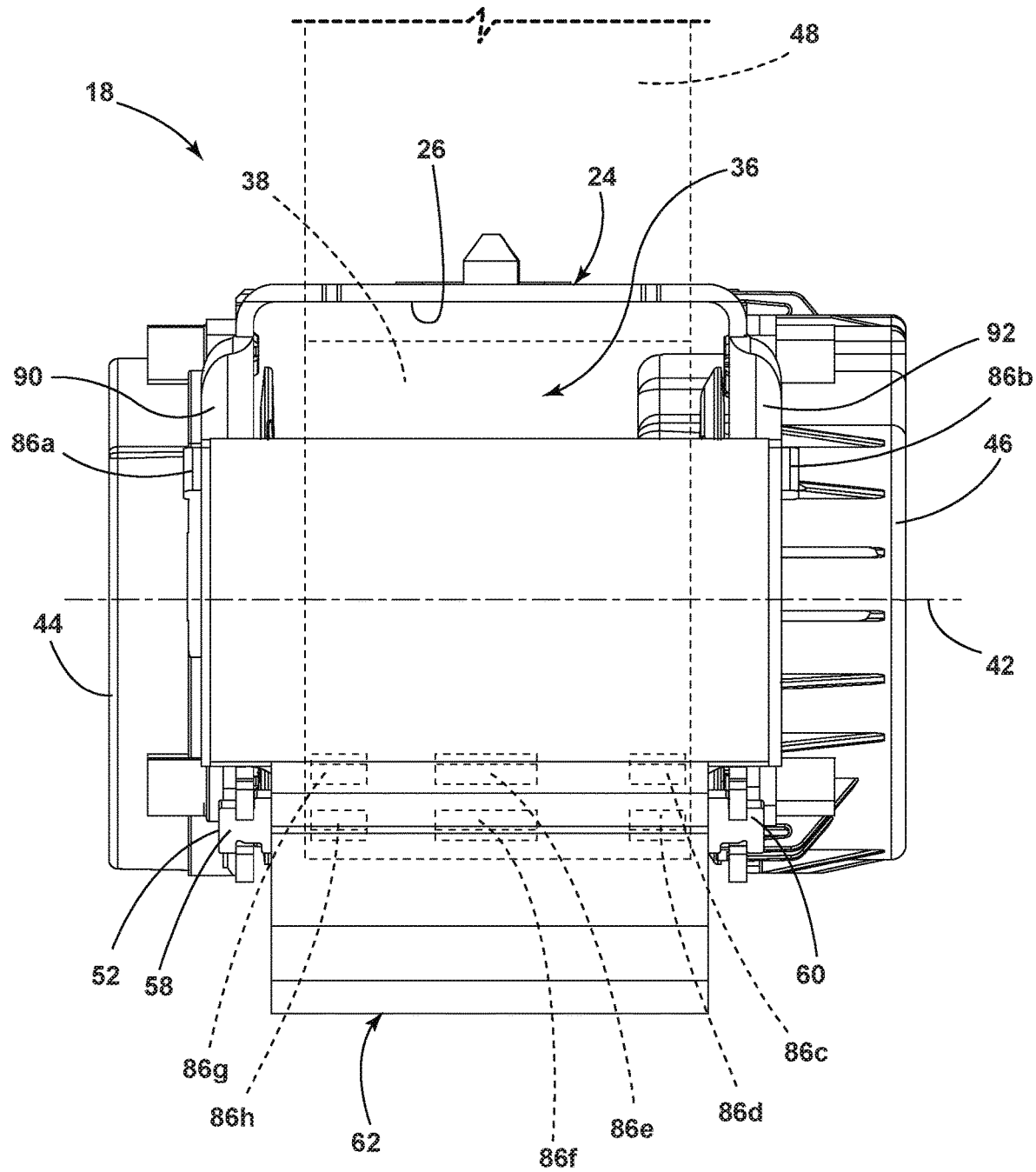
FIG. 8 is a top view of the seatbelt retractor assembly of FIG. 1, illustrating a second cross member extending between the first side wall and the second side wall, as well as pairs of opposing snap fit elements (in phantom) of the cover attaching the cover to the second cross member.
Figure 9:
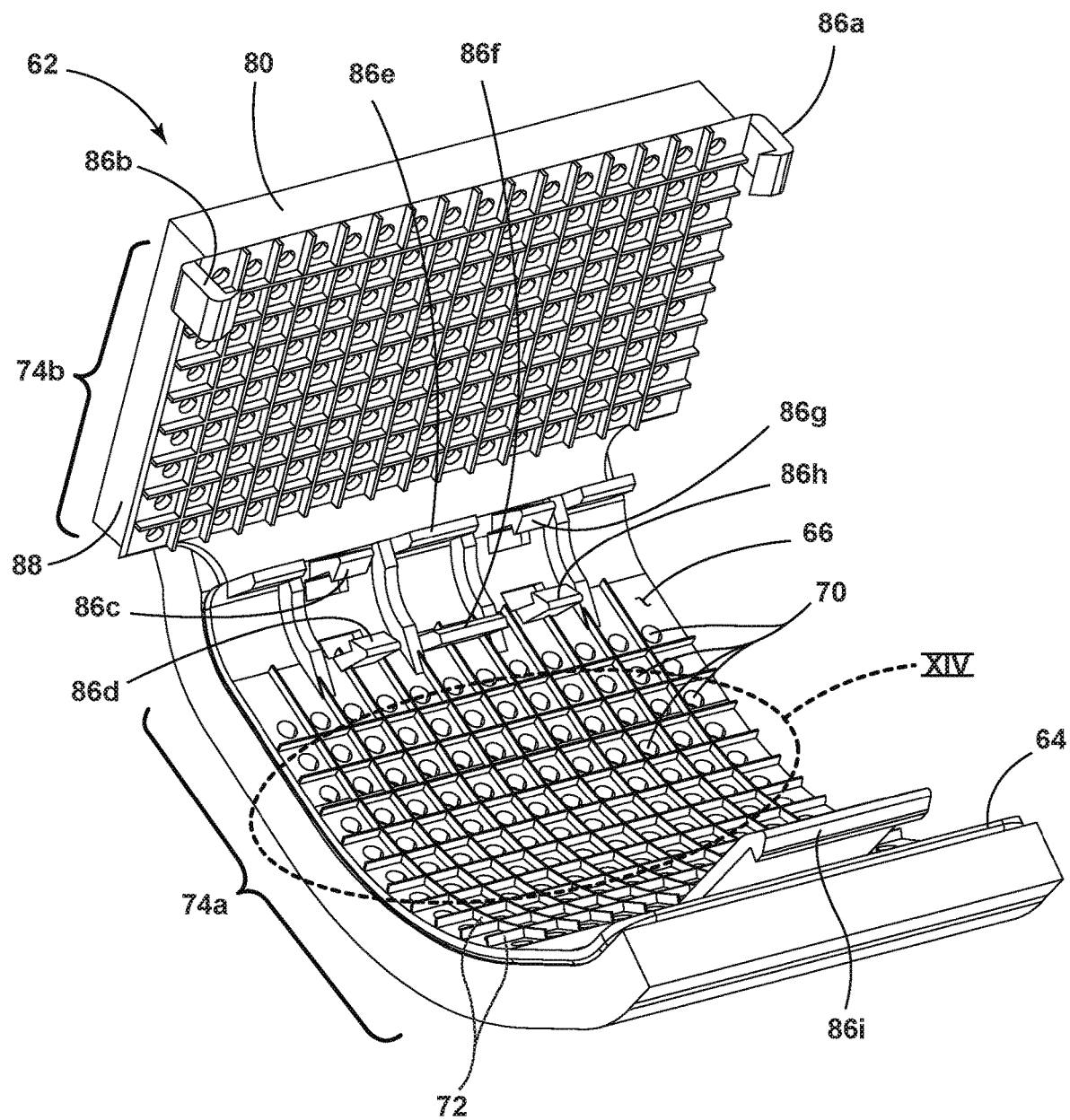
FIG. 9 is a perspective view of the cover of FIG. 2, illustrating opposing snap-fit fastening elements to attach the cover to the first cross member and the second cross member, as well as the first side wall and the second side wall of the frame of the seatbelt retractor assembly.
Figure 10:
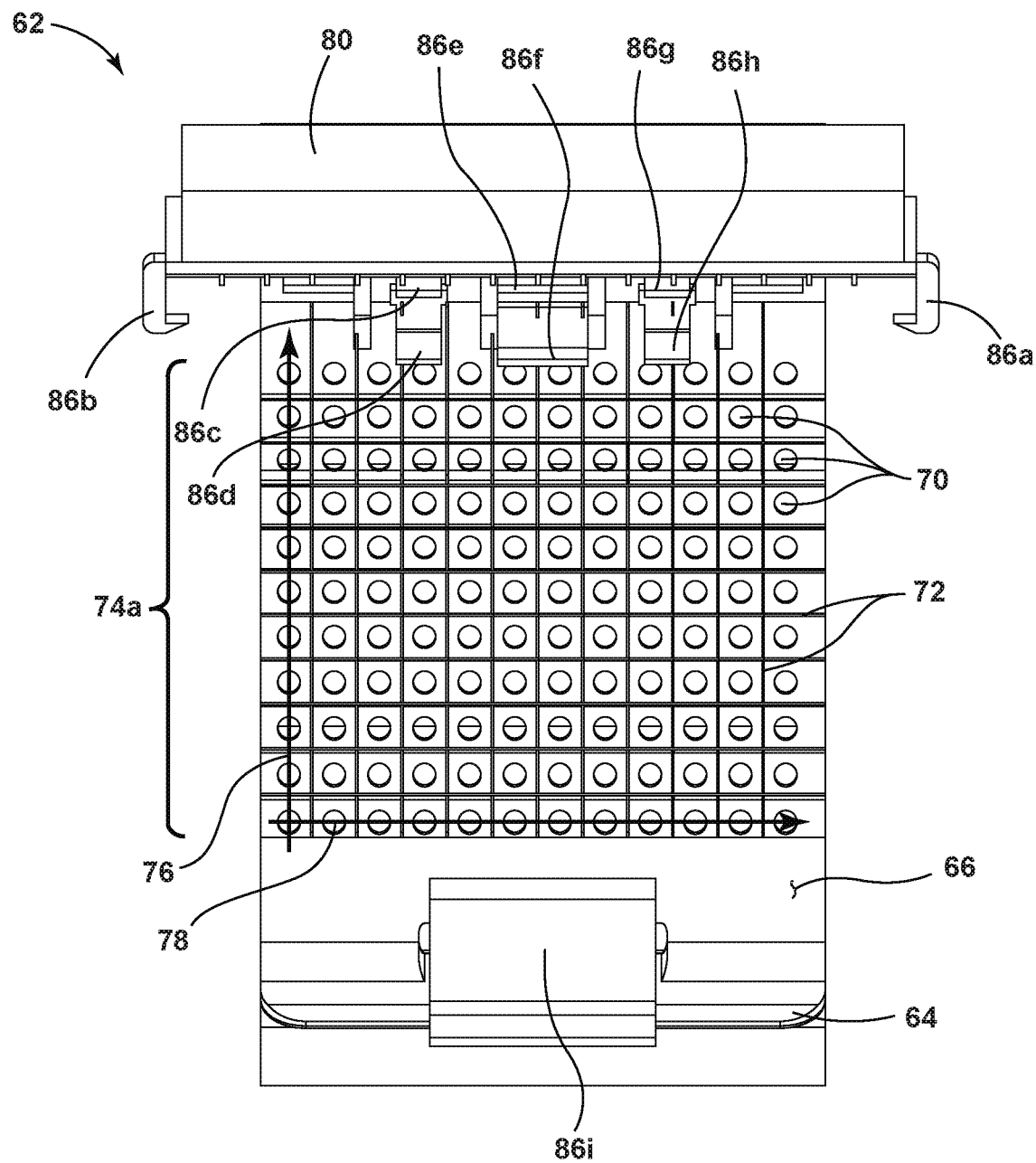
FIG. 10 is a bottom view of the cover of FIG. 2, illustrating that the cover has a first layer of a lesser thickness than a second layer, a plurality of holes extending through the first layer, and baffles surrounding each of the plurality of holes forming a grid.
Figure 11:
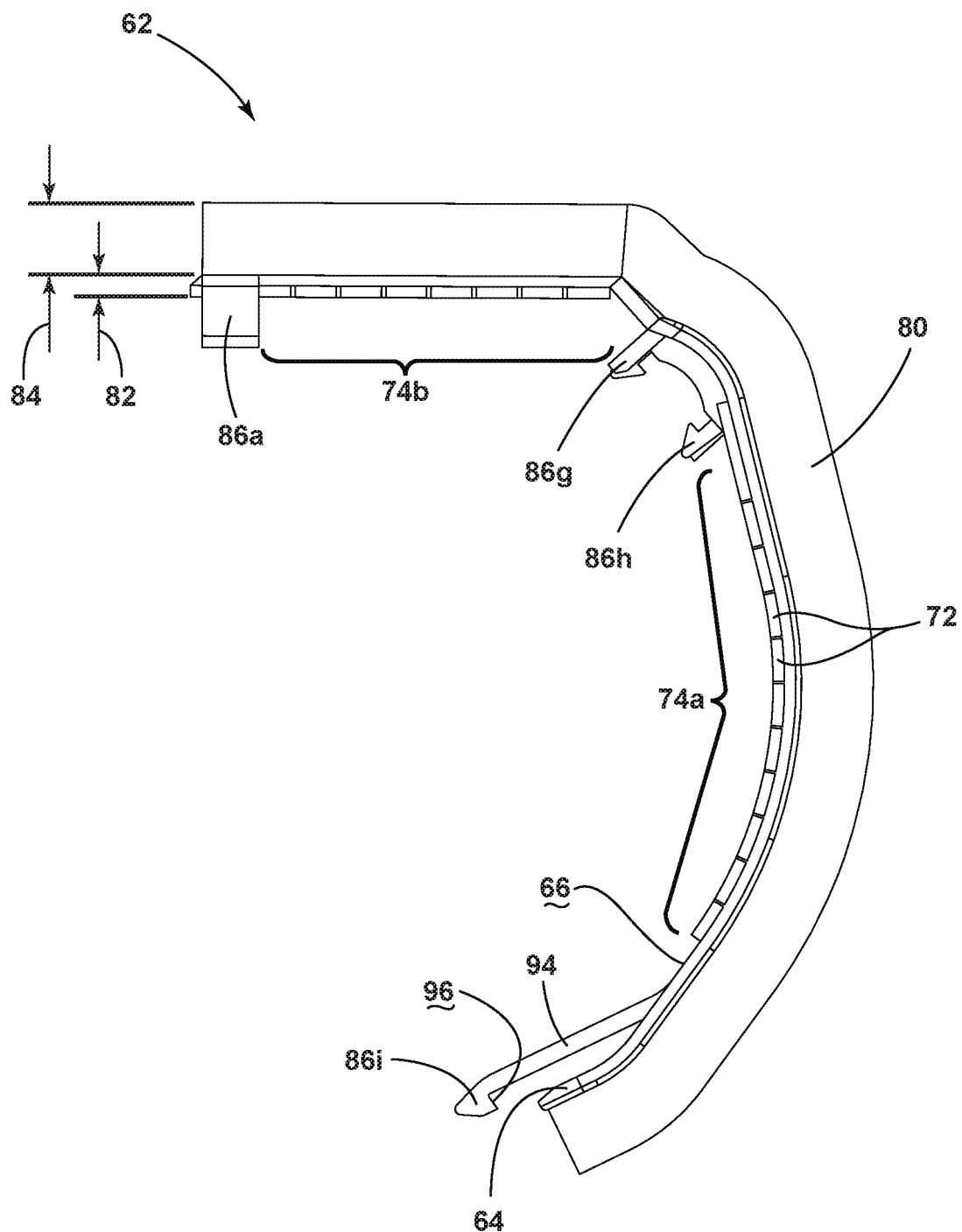
FIG. 11 is a side view of the cover of FIG. 2, illustrating a pair of opposing snap fit fastening elements configured to attach the cover to the second cross member of the seatbelt retractor assembly.
Figure 12:
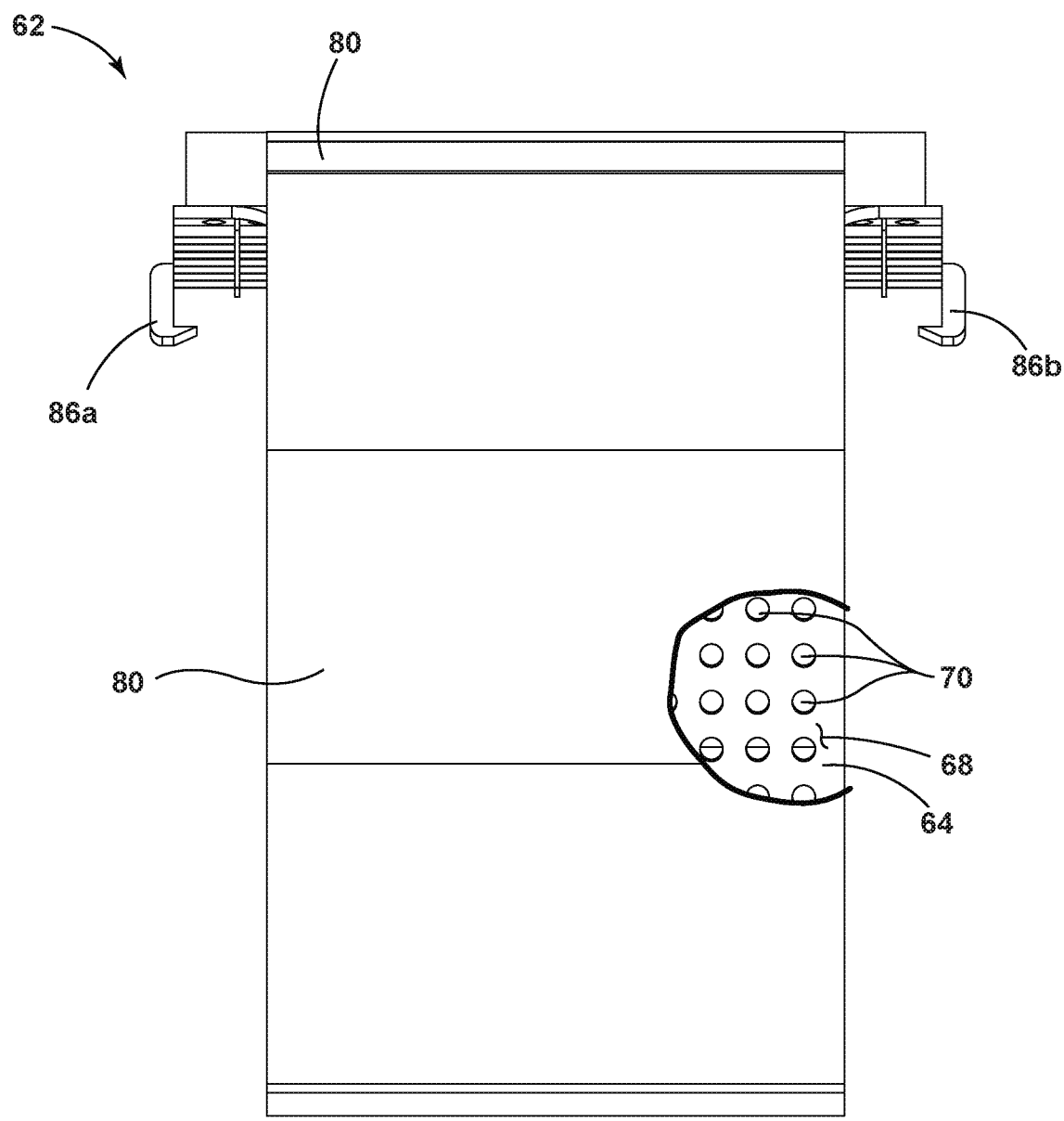
FIG. 12 is a top view of the cover of FIG. 2, illustrating the plurality of holes of the first layer extending through to the second layer, and a pair of snap fit fastening elements disposed along a perimeter of the cover configured to attach the cover to a lip extending outward from each of the first side wall and the second side wall of the seatbelt retractor assembly.
Figure 13:
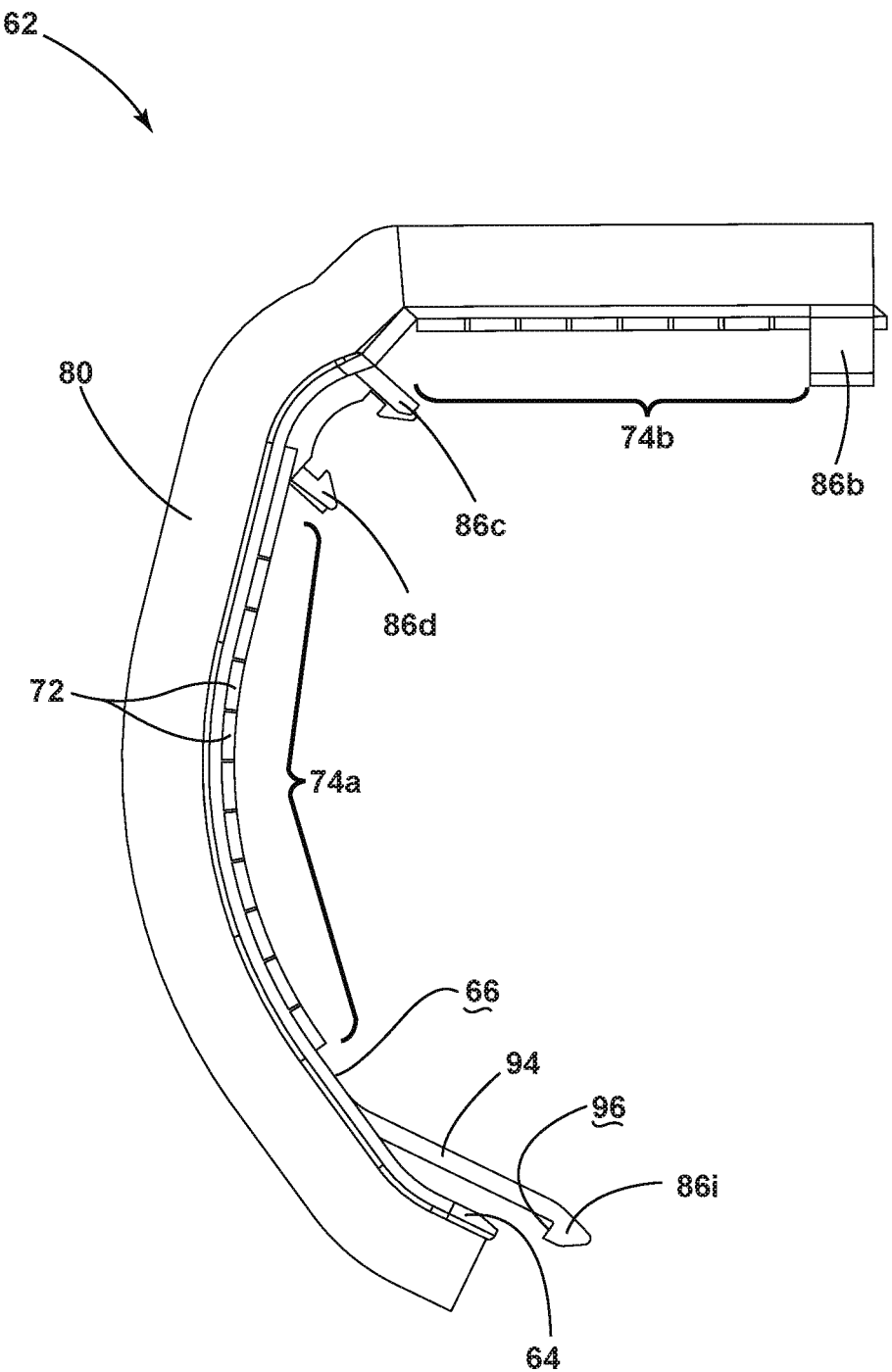
FIG. 13 is an opposite side view of the cover of FIG. 2, illustrating another pair of opposing snap fit elements configured to attach the cover to the second cross member of the seatbelt retractor assembly, as well as a tab-like snap fit fastening element configured to attach the cover to the first cross member of the seatbelt retractor assembly.
Figure 14:
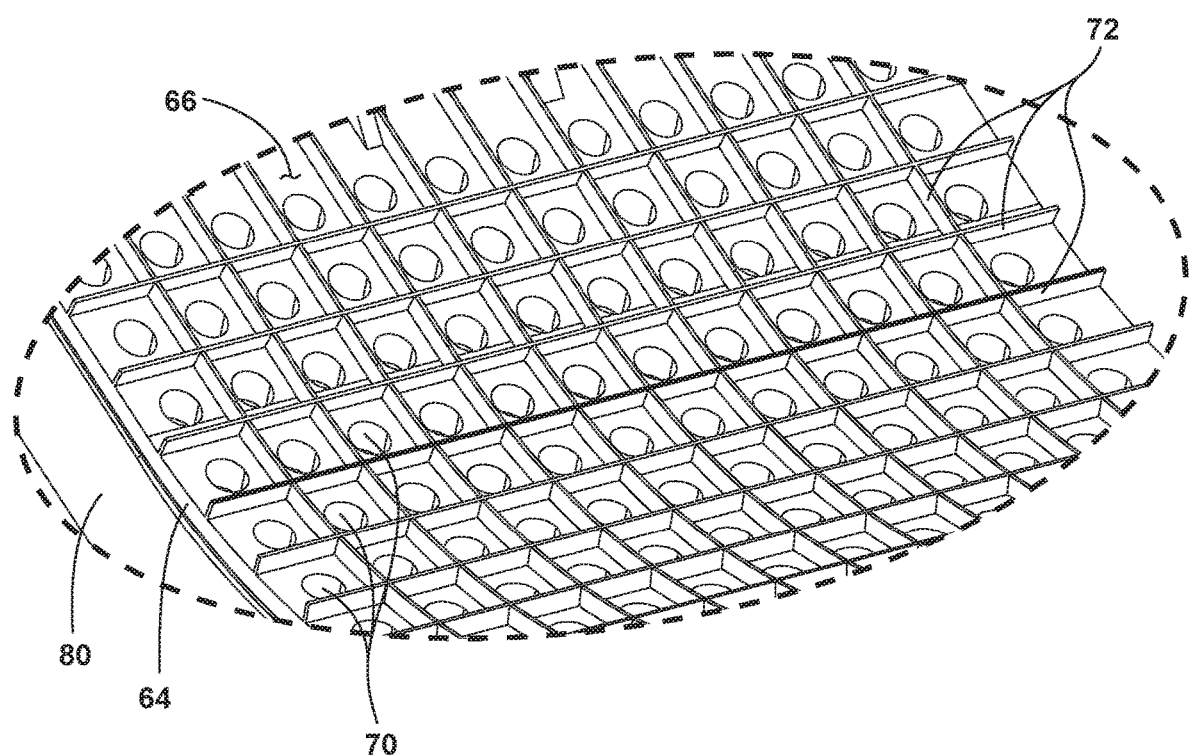
FIG. 14 is a perspective view of area XIV of FIG. 9, illustrating the plurality of holes through the first layer of the cover of FIG. 2, and baffles surrounding each of the plurality of holes.

Referring to FIGS. 1-2, a vehicle 10 includes a seatbelt restraint system 12 disposed adjacent a seating assembly 14. The seatbelt restraint system 12 secures an occupant (not illustrated) of the seating assembly 14 to the seating assembly 14 during use of the vehicle 10. The seatbelt restraint system 12 includes a seatbelt webbing 16 and a seatbelt retractor assembly 18. The seatbelt retractor assembly 18 retracts the seatbelt webbing 16 so that, while restraining the occupant, slack in the seatbelt webbing 16 is reduced. The seatbelt retractor assembly 18 can be disposed behind an interior trim panel 20 and secured to a frame 22 of the vehicle 10.

Referring now additionally to FIGS. 3-8, the seatbelt retractor assembly 18 includes a frame 24. The frame 24, which can be formed of metal, provides structure to allow the seatbelt retractor assembly 18 to be attached to the frame 22 of the vehicle 10 and structure to support other components of the seatbelt retractor assembly 18. The frame 24 includes a lateral wall 26. The frame 24 further includes an aperture 28, which may be disposed through the lateral wall 26, to allow the frame 24 to be attached to the frame 22 of the vehicle via a fastener 30. The frame 24 further includes a pair of opposing side walls 32, 34, namely a first side wall 32 and a second side wall 34. The first side wall 32 and the second side wall 34 extend from the lateral wall 26. The first side wall 32 and the second side wall 34 can extend orthogonally or approximately orthogonally from the lateral wall 26. The first side wall 32, the second side wall 34, and the lateral wall 26 form a webbing retaining area 36 where a wound portion 38 of the seatbelt webbing 16 is retained within the seatbelt retractor assembly 18.

The seatbelt retractor assembly 18 further includes a spool 40. The spool 40 is configured to rotate about its axis 42 (see FIG. 7) to wind the seatbelt webbing 16 around the spool 40. The spool 40 is disposed within the webbing retaining area 36 and extends between the first side wall 32 and the second side wall 34. The spool 40 may extend through both the first side wall 32 and the second side wall 34 laterally beyond the first side wall 32 and the second side wall 34. The axis 42 of the spool 40 can be generally orthogonal to the first side wall 32 and the second side wall 34, and thus, generally parallel to the lateral wall 26.

The seatbelt retractor assembly 18 can include one or both of a first casing 44 and a second casing 46. The first casing 44 is adjacent to and can be attached to the first side wall 32, in the direction laterally away from the second side wall 34. The first casing 44 can include various components that assist the seatbelt retractor assembly 18 in winding (retracting) the seatbelt webbing 16, such as a biasing spring 45. The second casing 46 is adjacent to and can be attached to the second side wall 34, in the direction laterally away from the first side wall 32. The second casing 46 can include various components that assist the seatbelt retractor assembly 18 in winding (retracting) the seatbelt webbing 16, such as one or more gears 47 (see FIG. 6), a sensor ball 49, and other small moving parts (not illustrated). Movement of the sensor ball 49, in particular, can generate considerable noise.

The seatbelt retractor assembly 18 further includes the seatbelt webbing 16. The seatbelt webbing 16 includes the wound portion 38 and an unwound portion 48. The unwound portion 48 extends away from the webbing retaining area 36. The wound portion 38 is wound around the spool 40.

The seatbelt retractor assembly 18 can further include one or more cross members 50, 52, such as a first cross member 50 and a second cross member 52, as in the illustrated embodiment. The cross members 50, 52 can add structural stability to the seatbelt retractor assembly 18. The cross members 50, 52 can be attached to or contiguous with the first side wall 32 and the second side wall 34. For example, the first cross member 50 has a first end 54 connected to the first side wall 32 and a second end 56 connected to the second side wall 34. Likewise, the second cross member 52 has a first end 58 connected to the first side wall 32 and a second end 60 connected to the second side wall 34. The cross members 50, 52 are disposed above the wound portion 38 of the seatbelt webbing 16 and further define the webbing retaining area 36.

Referring now additionally to FIGS. 9-14, the seatbelt retractor assembly 18 further includes a cover 62. The cover 62 reduces the audible noise that the seatbelt retractor assembly 18 produces as it winds the seatbelt webbing 16 around the spool 40, or as the seatbelt webbing 16 is unwound from the spool 40, such as when the occupant is securing or adjusting the seatbelt restraint system 12. The cover 62 is disposed over (but not necessarily contacting) the wound portion 38 of the seatbelt webbing 16.

The cover 62 includes a first layer 64. The first layer 64 can be made of plastic. The first layer 64 has an inside surface 66 and an outside surface 68. The inside surface 66 faces in the direction of the wound portion 38 of the seatbelt webbing 16, that is, the portion of the seatbelt webbing 16 that has been retracted by the seatbelt retractor assembly 18 and wound around the spool 40. The outside surface 68 faces in a direction away from the wound portion 38 of the seatbelt webbing 16. The cover 62 further includes a plurality of holes 70. The plurality of holes 70 are disposed through the first layer 64 from the inside surface 66 through to the outside surface 68. The cover 62 further includes baffles 72 adjacent each of the plurality of holes 70. The baffles 72 are disposed on the inside surface 66 and extend away from the inside surface 66. In the illustrated embodiment, the baffles 72 and the plurality of holes 70 form one or more grids 74 (including grid 74a and grid 74b). The grid 74a of the illustrated embodiment includes eleven holes 70 aligned in a first direction 76 (see FIG. 10) and twelve holes 70 aligned in a second direction 78, which is orthogonal to the first direction 76. The grid 74 could include any other number of holes 70 aligned in the first direction 76 or the second direction 78, such as four, seven, ten, twenty, or any number between four and twenty, or more. In the illustrated embodiment, the baffles 72 adjacent each of the plurality of holes 70 are contiguous, and thus, form a square or rectangular baffle around each of the plurality of holes 70. Such contiguously formed baffles 72 may form other shapes, depending on the directional arrangement of the plurality of holes 70, such as a diamond shape.

The cover 62 can further include a second layer 80, which includes foam, over the first layer 64. The second layer 80 at least partially covers the outside surface 68 of the first layer 64. The second layer 80 may be adhered to the outside surface 68 of the first layer 64, such as via an adhesive. The first layer 64 has a thickness 82 (see FIG. 11), as defined by the distance between the inside surface 66 and the outside surface 68. The second layer 80 has a thickness 84. The thickness 84 of the second layer 80 can be, and in the illustrated embodiment is, greater than the thickness 82 of the first layer 64.

Without being bound to any specific principle of operation, it is thought that the baffles 72 reflect and disperse sound waves generated by various working components of the seatbelt retractor assembly 18. A portion of the sound waves transmits through the plurality of holes 70 and into the second layer 80. The second layer 80, which includes a sound absorption material, such as foam, absorbs a portion of the sound waves transmitted through the plurality of holes 70, thus reducing audible noise that the occupant of the vehicle 10 can hear.

The cover 62 can be, and in the illustrated embodiment is, attached to the frame 24. The cover 62 can be disposed generally between the first casing 44 and the second casing 46 in that both the first casing 44 and the second casing 46 extend laterally outward relative to the cover 62. To assist in attaching the cover 62 to the frame 24, the cover 62 can include snap fit fastening elements 86 that are configured to connect the cover 62 to the seatbelt retractor assembly 18. For example, the cover 62 can include a first pair of opposing snap fit fastening elements 86a, 86b disposed along a perimeter 88 of the cover 62. The first side wall 32 of the frame 24 can include a laterally extending lip 90, and the snap fit fastening element 86a of the cover 62 can snap over the lip 90. The second side wall 34 likewise can include a laterally extending lip 92, and the snap fit fastening element 86b can snap over the lip 92. Because the snap fit fastening elements 86a, 86b oppose each other, the cover 62 is thus attached to the first side wall 32 and the second side wall 34, respectively, of the frame 24. The cover 62 can include additional opposing snap fit fastening elements 86 along the perimeter 88 to further secure the cover 62 to the first side wall 32 and the second side wall 34 of the frame 24. In addition, the cover 62 can include additional pairs of opposing snap fit fastening elements 86 that are not disposed along the perimeter 88, but extend away from the inside surface 66, such as a pair of opposing snap fit fastening elements 86c, 86d, a pair of opposing snap fit fastening elements 86e, 86f, and a pair of opposing snap fit fastening elements 86g, 86h. These three sets of pairs of opposing snap fit fastening elements 86c and 86d, 86e and 86f, and 86g and 86h snap over the second cross member 52, between the first end 58 and the second end 60, and thus attach the cover 62 to the second cross member 52. Moreover, the cover 62 can include a tab-like snap fit fastening element 86i, which snaps under the first cross member 50 between the first cross member 50 and the wound portion 38 of the seatbelt webbing 16, thus further attaching the cover 62 to the seatbelt retractor assembly 18. In general, the snap fit fastening elements 86 each include an outwardly extending cantilever portion 94 that terminates in a locking surface 96, which is at least approximately orthogonal to the cantilever portion 94 and is configured to contact the frame 24. Instead of utilizing the snap fit fastening elements 86, the cover 62 could be attached to the seatbelt retractor assembly 18, such as the frame 24, the first casing 44, the second casing 46, the first cross member 50, and the second cross member 52 thereof, using fasteners such as screws or an adhesive.

The cover 62 and the frame 24 cooperate to at least partially encase the wound portion 38 of the seatbelt webbing 16. The cover 62 at least partially encases the wound portion 38 of the seatbelt webbing 16 that is not encased by the lateral wall 26 and the pair of opposing side walls 32, 34 of the frame 24. The cover 62 is disposed at least approximately parallel to the axis 42 of rotation of the spool 40. The cover 62 can significantly reduce the audible noise generated by the seatbelt retractor assembly 18, including the sensor ball 49 thereof.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cover for a seatbelt retractor assembly comprising:
   a first layer having an inside surface configured to face a seatbelt webbing retracted by a seatbelt retractor assembly, an outside surface configured to face away from the seatbelt webbing, a plurality of holes disposed through the first layer, and baffles adjacent each of the plurality of holes; and
   a second layer over the first layer, the second layer at least partially covering the outside surface of the first layer, the plurality of holes of the first layer extend from the inside surface of the first layer through the outside surface of the first layer to the second layer, and the baffles extend from the inside surface of the first layer away from the second layer.

2. The cover of claim 1,
   the first layer comprising plastic.

3. The cover of claim 1,
   the second layer comprising foam.

4. The cover claim 3,
   the first layer having a thickness;
   the second layer having a thickness;
   wherein, the thickness of the second layer is greater than the thickness of the first layer.

5. The cover of claim 1,
   the second layer is adhered to the first layer with an adhesive.

6. The cover of claim 1,
   the plurality of holes and the baffles adjacent each of the plurality of holes forming a grid.

7. The cover of claim 6,
   the grid including at least four holes aligned in a first direction and at least four holes aligned in a second direction, which is orthogonal to the first direction.

8. The cover of claim 1 further comprising:
   snap fit fastening elements configured to connect the cover to the seatbelt retractor assembly.

9. The cover of claim 8,
   the snap fit fastening elements including a pair of opposing snap fit fastening elements disposed along a perimeter of the cover.

10. The cover of claim 8,
    the snap fit fastening elements including a first pair of opposing snap fit fastening elements, a second pair of opposing snap fit fastening elements, and a third pair of opposing snap fit fastening elements.

11. A seatbelt retractor assembly for a vehicle comprising:
    a frame including a lateral wall and a pair of opposing side walls extending from the lateral wall forming a webbing retaining area;
    a spool disposed within the webbing retaining area between the pair of opposing side walls;
    seatbelt webbing including a wound portion wound around the spool and an unwound portion extending away from the webbing retaining area; and
    a cover disposed over at least part of the wound portion of the seatbelt webbing, the cover comprising:
       a first layer having an inside surface facing the wound portion of the seatbelt webbing and an outside surface facing away from the wound portion of the seatbelt webbing;
       a plurality of holes disposed through the first layer from the inside surface through to the outside surface;
       baffles adjacent each of the plurality of holes; and
       snap fit fastening elements attaching the cover to the frame.

12. The seatbelt retractor assembly of claim 11,
    the pair of opposing side walls of the frame including a first side wall and a second side wall; and
    the snap fit fastening elements including: a first snap fit fastening element attaching the cover to the first side wall; and a second snap fit fastening element opposing the first snap fit fastening element and attaching the cover to the second side wall.

13. The seatbelt retractor assembly of claim 12 further comprising:
    a cross member with a first end connected to the first side wall of the pair of opposing side walls of the frame and a second end connected to the second side wall of the pair of opposing side walls of the frame, the cross member disposed above the wound portion of the seatbelt webbing; and
    the snap fit fastening elements of the cover further including a third snap fit fastening element attaching the cover to the cross member and a fourth snap fit fastening element opposing the third snap fit fastening element attaching the cover to the cross member.

14. The seatbelt retractor assembly of claim 11 further comprising:
    a cross member with a first end connected to a first side wall of the pair of opposing side walls of the frame and a second end connected to a second side wall of the pair of opposing side walls of the frame, the cross member disposed above the wound portion of the seatbelt webbing; and
    the snap fit fastening elements including: a first snap fit fastening element attaching the cover to the cross member; and a second snap fit fastening element opposing the first snap fit fastening element attaching the cover to the cross member.

15. The seatbelt retractor assembly of claim 11 further comprising:
    a first casing disposed laterally of a first side wall of the pair of opposing side walls of the frame; and
    a second casing disposed laterally of a second side wall of the pair of opposing side walls of the frame;
    wherein, both the first casing and the second casing extend laterally outward relative to the cover.

16. The seatbelt retractor assembly of claim 11,
    the cover further comprising a second layer over the outside surface of the first layer, the second layer comprising a foam.

17. The seatbelt retractor assembly of claim 11,
wherein, the baffles adjacent each of the plurality of holes are disposed on the inside surface of the first layer of the cover.

18. The seatbelt retractor assembly of claim 11,
the plurality of holes and the baffles adjacent each of the plurality of holes forming a grid, the grid including at least four holes aligned in a first direction and at least four holes aligned in a second direction, which is orthogonal to the first direction.

19. A seatbelt retractor assembly for a vehicle comprising:
a frame including a lateral wall and a pair of opposing side walls extending from the lateral wall forming a webbing retaining area;
a spool disposed within the webbing retaining area between the pair of opposing side walls, the spool having an axis of rotation;
seatbelt webbing including a wound portion wound around the spool and an unwound portion extending away from the webbing retaining area; and
a cover attached to the frame and disposed over the wound portion of the seatbelt webbing at least approximately parallel to the axis of rotation of the spool, the cover and the frame cooperating to at least partially encase the wound portion of the seatbelt webbing, with the cover at least partially encasing the wound portion not encased by the lateral wall and the pair of opposing side walls of the frame;
wherein, the cover comprises:
a first layer having an inside surface facing the wound portion of the seatbelt, an outside surface facing away from the wound portion, a plurality of holes disposed through the first layer, and baffles adjacent each of the plurality of holes; and
a second layer over the first layer, the second layer at least partially covering the outside surface of the first layer, the plurality of holes of the first layer extending from the inside surface of the first layer through the outside surface of the first layer to the second layer, and the baffles extending from the inside surface of the first layer away from the second layer.

20. The seatbelt retractor assembly of claim 19, the cover further comprising:
snap fit fastening elements attaching the cover to the frame.

\* \* \* \* \*